(12) United States Patent
Shimazaki et al.

(10) Patent No.: US 7,281,287 B2
(45) Date of Patent: Oct. 16, 2007

(54) PROP-TYPE DAMPING DEVICE

(75) Inventors: Yoji Shimazaki, Shibuya-ku (JP); Morio Obata, Minato-ku (JP); Wataru Morijiri, Minato-ku (JP)

(73) Assignees: Tokai University Educational System, Tokyo (JP); Nippon Comsys Corporation, Tokyo (JP)

( * ) Notice: Subject to any disclaimer, the term of this patent is extended or adjusted under 35 U.S.C. 154(b) by 598 days.

(21) Appl. No.: 10/795,252

(22) Filed: Mar. 9, 2004

(65) Prior Publication Data

US 2005/0050810 A1 Mar. 10, 2005

(30) Foreign Application Priority Data

Sep. 9, 2003 (JP) .............................. 2003-317045

(51) Int. Cl.
*E01D 19/00* (2006.01)
*E01D 1/00* (2006.01)

(52) U.S. Cl. ................................ 14/14; 14/22; 14/73.5; 14/78; 52/167.1; 52/167.8

(58) Field of Classification Search ................ 52/167.3, 52/167.7, 167.9, DIG. 4, 1, 573.1, 167.4, 52/167.8; 14/14, 22, 73.5, 78
See application file for complete search history.

(56) References Cited

U.S. PATENT DOCUMENTS

| | | | | |
|---|---|---|---|---|
| 4,261,149 A | * | 4/1981 | Gustafson | 52/292 |
| 4,726,161 A | * | 2/1988 | Yaghoubian | 52/167.6 |
| 5,303,524 A | * | 4/1994 | Caspe | 52/167.2 |
| 5,845,438 A | * | 12/1998 | Haskell | 52/167.1 |
| 6,058,663 A | * | 5/2000 | MacKarvich | 52/167.3 |
| 6,318,032 B2 | * | 11/2001 | MacKarvich | 52/167.3 |
| 6,437,905 B1 | * | 8/2002 | Joyner et al. | 359/332 |
| 6,438,905 B2 | * | 8/2002 | Constantinou | 52/167.3 |
| 6,546,686 B2 | * | 4/2003 | MacKarvich | 52/299 |

FOREIGN PATENT DOCUMENTS

| | | | |
|---|---|---|---|
| JP | 10-298916 | * | 11/1998 |
| JP | 11-323826 | * | 11/1999 |
| JP | 2000-120022 | * | 4/2000 |
| JP | 2001-220709 | * | 8/2001 |
| JP | 2002-07228 A | | 3/2002 |
| JP | 2005-299078 | * | 10/2005 |

* cited by examiner

*Primary Examiner*—Robert Canfield
(74) *Attorney, Agent, or Firm*—Oliff & Berridge, PLC

(57) ABSTRACT

There is disclosed a prop-type damping device which effectively consumes energy of up-and-down vibration on a main girder of a bridge caused by earthquakes, winds, passing vehicles or the like to prolong a life of the bridge and improve comfort for bridge users with a simple constitution. The prop-type damping device comprises: an inclined prop member having a higher end thereof connected to a lower part of a main girder of a bridge to be horizontally movable relative to the same, and a lower end thereof connected to a position below a main girder supporting point of a pier or abutment for supporting the main girder to permit up-and-down movement of the higher end; and a damper connected to the higher end of the prop member and the main girder lower part to brake relative horizontal movements therebetween.

10 Claims, 5 Drawing Sheets

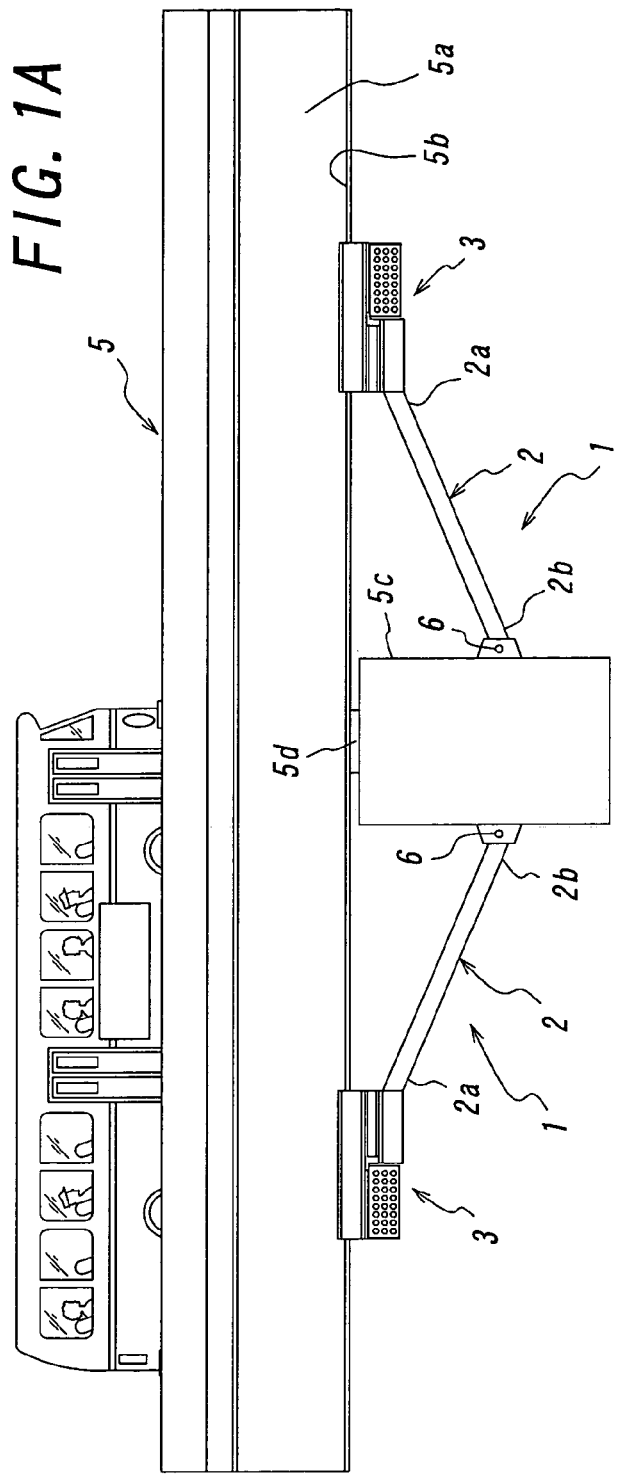
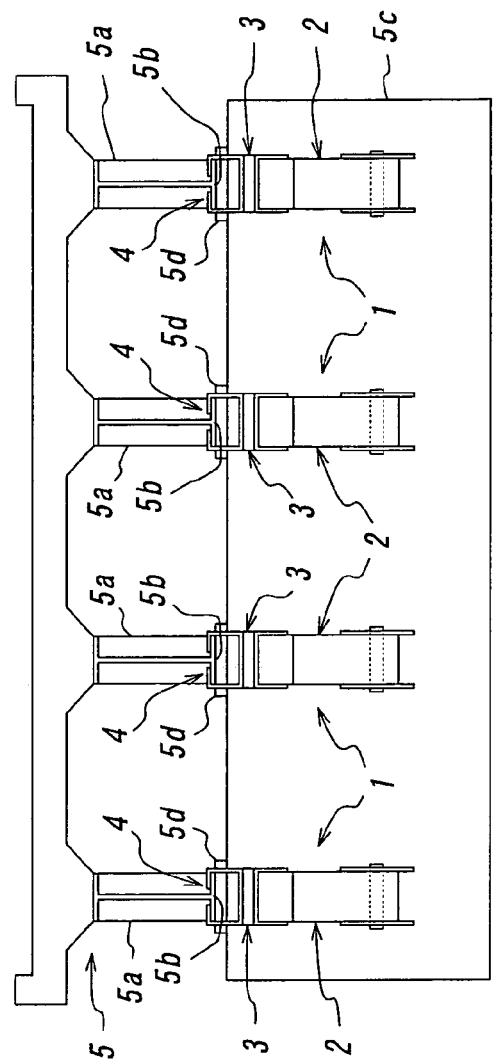

PROP-TYPE DAMPING DEVICE

BACKGROUND OF THE INVENTION

1. Field of the Invention

The present invention relates to a prop-type damping device which converts up-and-down vibration caused by earthquakes, winds, passing vehicles and the like on a main girder of a bridge such as an elevated bridge into horizontal displacement by a tip of a prop-shaped member, and consumes displacement energy thereof by a damper to reduce the up-and-down vibration of the main girder.

2. Description of the Related Art

A structure is deformed upon reception of external forces by earthquakes, winds, passing vehicles and the like to store energy therein. With this energy the structure causes next deformation therein to keep balance. If this energy is consumed before the next deformation occurs, it is possible to reduce the deformation of the structure. For example, a main girder of a bridge for a road, a railway or the like is vibrated up and down upon reception of the external forces from earthquakes, winds, passing vehicles or the like. If energy of such up-and-down vibration which occurs on the main girder is consumed, a life of the bridge can be prolonged, and comfort for bridge users can be greatly improved.

Meanwhile, as a damping device for damping up-and-down vibration of a floor structure of a building, there has conventionally been known a damping device which arranges a viscoelastic plate between a steel plate and a connection plate facing thereto, adheres both surfaces of the viscoelastic plate to the steel plate and the connection plate, fixes the steel plate to a center side face of a beam for supporting the floor, connects the connection plate to mutually proximate higher ends of two straight members inclined in reverse-V shapes, fixes mutually separate lower ends of the straight members to lower support members under girths for supporting both ends of the beam, accordingly fixes the connection plate to framing of the building to prevent vibration of the connection plate with the floor, and absorbs energy of the up-and-down vibration of the floor by up-and-down shearing deformation of the viscoelastic plate.(e.g., see Japanese Patent Laid-Open No. 2002-70228).

However, If the damping structure that fixes the connection plate by the two straight members inclined in reverse-V shapes to prevent up-and-down vibration thereof is applied to the main girder of the bridge, since an effective span distance of the main girder of the bridge is generally very long the straight members become extremely long to nearly lose inclination. Consequently, it is very difficult to fix the connection plate to prevent up-and-down movement thereof for practical purposes.

SUMMARY OF THE INVENTION

The present invention has been made with the foregoing problems in mind, and it is an object of the present invention to provide a damping device which disposes an inclined straight member below a main girder of a bridge, permits up-and-down movement of a higher end of the straight member in which the connection plate has conventionally been fixed not to be moved up and down with the floor, and provides damping effects by using the up-and-down movement.

In order to advantageously achieve the object, a prop-type damping device of the present invention comprises: an inclined prop member having a higher end connected to a lower part of a main girder of a bridge to be horizontally movable relative to the same, and a lower end connected to a position below a main girder supporting point of a pier or abutment for supporting the main girder to permit up-and-down movement of the higher end; and a damper connected to the higher end of the prop member and the main girder lower part to brake relative horizontal movements therebetween.

According to the prop-type damping device, because of a height difference between the main girder supporting point on the pier or abutment and the position of the pier or abutment to which the lower end of the prop member is connected, when the main girder is shaken up, the higher end of the prop member horizontally moved relative to the main girder lower part in a direction for approaching the main girder supporting point. When the main girder is shaken down, the higher end of the prop member is horizontally moved relative to the main girder lower part in a direction for moving away from the main girder supporting point. Then, the damper connected to the higher end of the prop member and the main girder lower part brakes the relative horizontal movements therebetween.

Thus, according to the prop-type damping device of the present invention, it is possible to prolong a life of the bridge and greatly improve comfort for bridge users by effectively consuming energy of up-and-down vibration on the main girder of the bridge caused by earthquakes, winds, passing vehicles or the like with a simple constitution.

According to the prop-type damping device of the present invention, the damper may be constitute by an oil damper, low yield point steel, a polymer, or simply stacked steel materials. More preferably, however, the damper has quake absorbing rubber (high damping rubber), a magnetic damping section which brakes a copper plate by a permanent magnet, or both thereof. In this way, since the quake absorbing rubber or the magnetic damping section is simple in constitution, maintenance management of the damping device can be facilitated.

Furthermore, according to the prop-type damping device of the present invention, the lower end of the prop member may be fixedly connected to the pier or abutment for supporting the girder, and up-and-down movement of the higher end may be permitted by elastic deformation of the prop member itself. More preferably, however, the lower end of the prop member is connected swingably by a pin to the pier or abutment for supporting the main girder. In this way, since up-and-down movement of the higher end of the prop member which accompanies the up-and-down movement of the main girder is facilitated, it is possible to make smoother relative horizontal movements of the higher end of the prop member and the main girder lower part.

BRIEF DESCRIPTION OF THE DRAWINGS

FIGS. 1A and 1B are front and side views schematically showing an embodiment of a prop-type damping device of the present invention.

DETAILED DESCRIPTION OF THE PREFERRED EMBODIMENT

Figure 2:
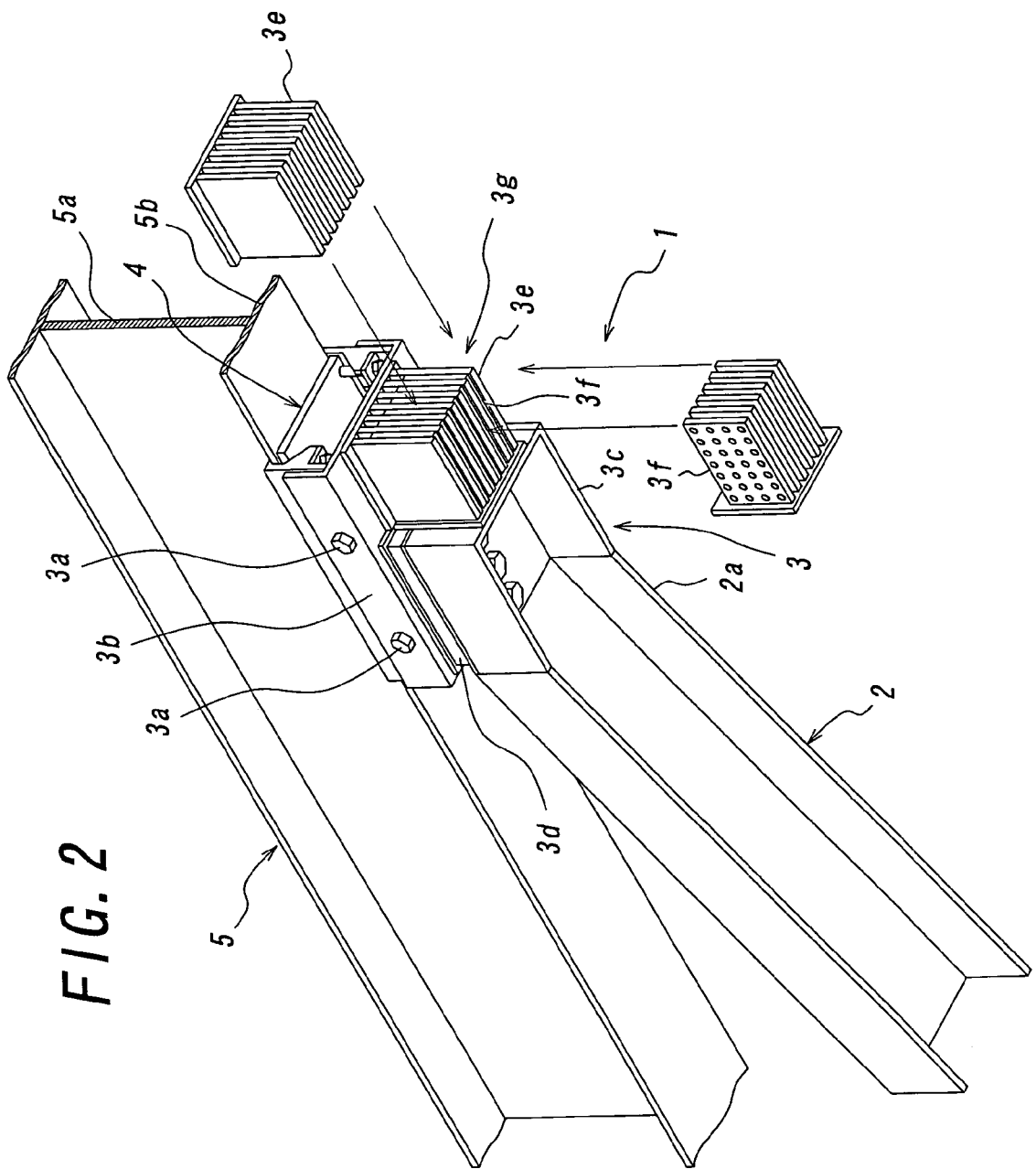
FIG. 2 is a perspective view showing the prop-type damping device of the embodiment seen obliquely from a lower side together with assembling method of a magnetic damping section.

Next, an embodiment of the present invention will be described in detail with reference to the accompanying drawings. As shown in FIGS. 1A, 1B and 2, the damping device of the embodiment which is denoted by a reference numeral 1 comprises an inclined prop member 2 and a damper 3. A higher end 2a of the prop member 2 is connected through metal, fittings 4 to a lower flange 5b of a main girder 5a so as to be horizontally movable relative to a lower part of the main girder 5a of a bridge 5. A lower end 2b of the prop member 2 is connected to be vertically swigable through a pin 6 to a position below an upper end of a rubber support floor 5d which constitutes a main girder supporting point of a pier 5c, whereby up-and-down movement of the higher end 2a is permitted.

Figure 3A:
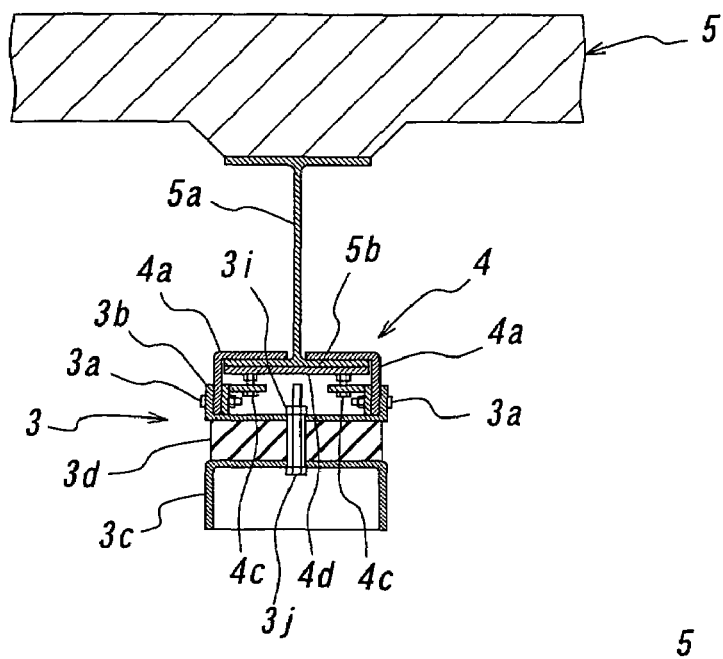
FIGS. 3A to 3C arm a sectional view, a partially cut-out front view, and a bottom view, respectively, showing the prop-type damping device of the embodiment.
Figure 3B:
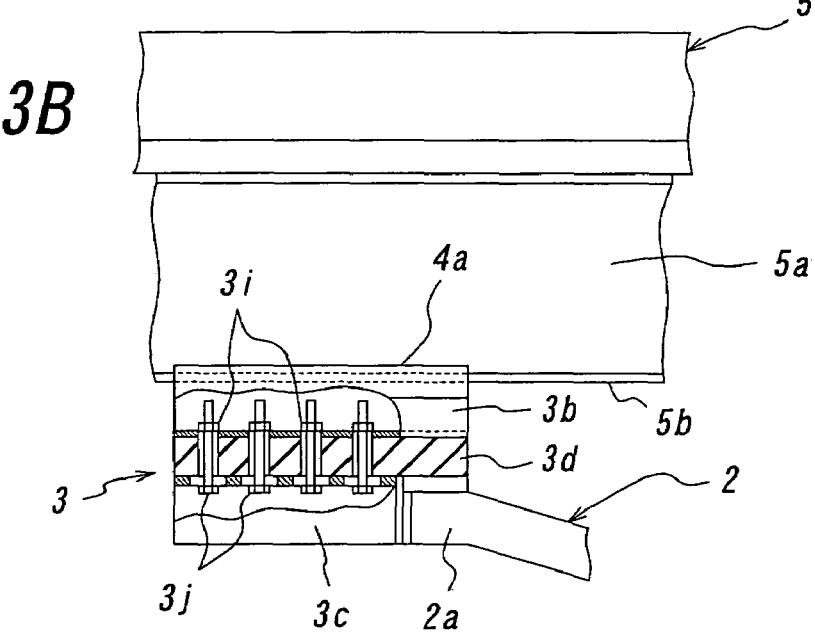
Figure 3C:
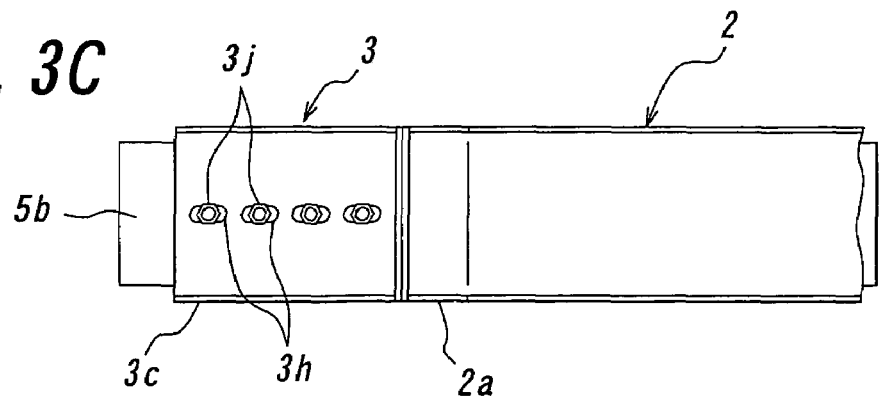

Here, so as to be fixable to the lower flange 5b of the main girder 5a without any processing such as boring therein, as shown in FIGS. 3A to 3C the metal fittings 4 have two attachment plates 4a L-shaped in section to be engaged with the lower flange 5b of the main girder 5a a bearing plate 4b for holding the lower flange 5b between horizontal parts of the attachment plates 4a, and pressing bolts 4c supported inside vertical parts of the attachment plates 4a to press the bearing plate 4b to the lower flange 5b. Accordingly, even if the higher end 2a of the prop member 2 is connected through the metal fittings 4 to the lower flange 5b of the main girder 5a, it is possible to prevent reductions in rigidity of the lower flange 5b.

Meanwhile, the damper 3 is connected to the higher end 2a of the prop member 2 and the lower part of the main girder 5a to brake relative horizontal movements therebetween. As shown in FIGS. 2, 3A to 3C the damper 3 has an upper plate 3b U-shaped in section to be fixed to the metal fittings 4 by a plurality of fixing bolts 3a, a lower plate 3c U-shaped in section to be integrated with the upper end 2a of the prop member 2 by welding or the like, quake absorbing rubber (high damping rubber) 3d made of a plurality of mutually vulcanized and bonded rubber plates and inserted between the upper and lower plates 3b and 3c so that top and bottom surfaces can be vulcanized and bonded to the upper and lower plates 3b and 3c, a magnetic damping section 3g (not shown in FIGS. 3A to 3C) having pluralities of damping copper plates 3e and permanent magnet mounting stainless plates 3f alternately arranged to be slid on each other in which the damping copper plates 3e and the permanent magnet mounting stainless plates 3f are fixed to the upper and lower plates 3b and 3c respectively, and a plurality of supporting bolts 3j inserted with play into a plurality of long holes 3h formed to be aligned in the upper and lower plates 3b and 3c and the quake absorbing rubber 3d, and secured by nuts 3i so as to prevent falling-off of the lower plate 3c.

Figure 4A:
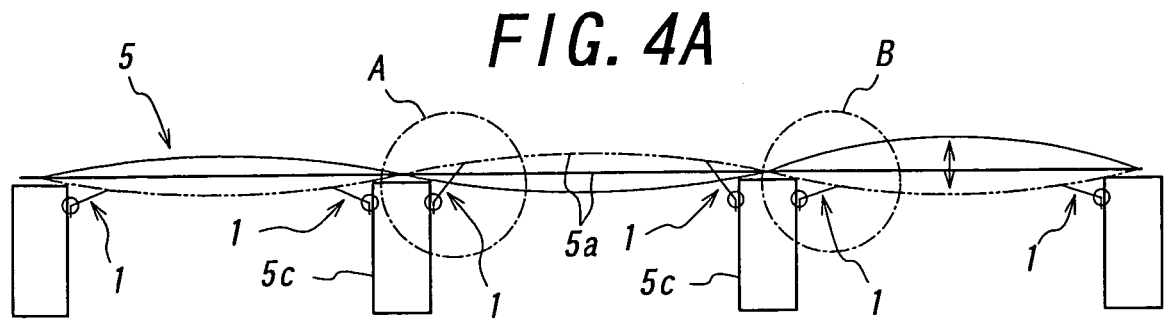
FIG. 4A is a conceptual diagram showing up-and-down vibration of a main girder of a bridge.
Figure 4B:
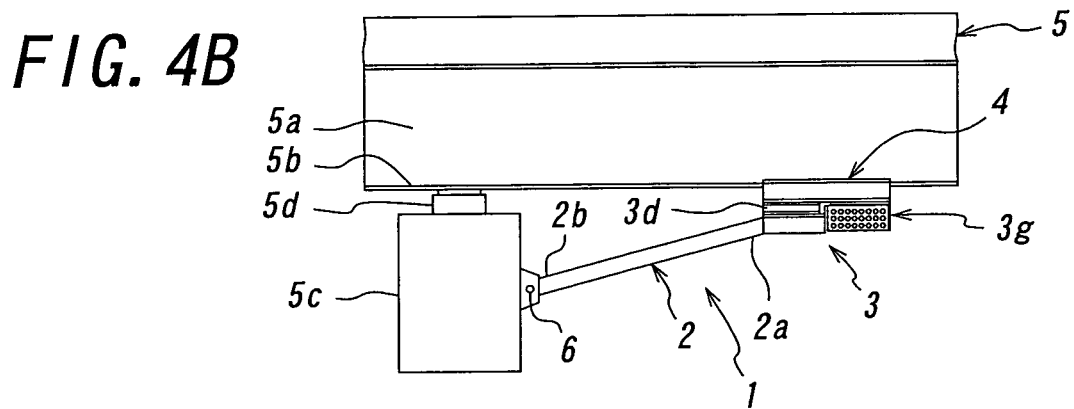
FIGS. 4B to 4D are operation explanatory views showing states of the prop-type damping device of the embodiment at stationary time of the main girder, at rising time of the main girder, and at falling time of the main girder, respectively.
Figure 4C:
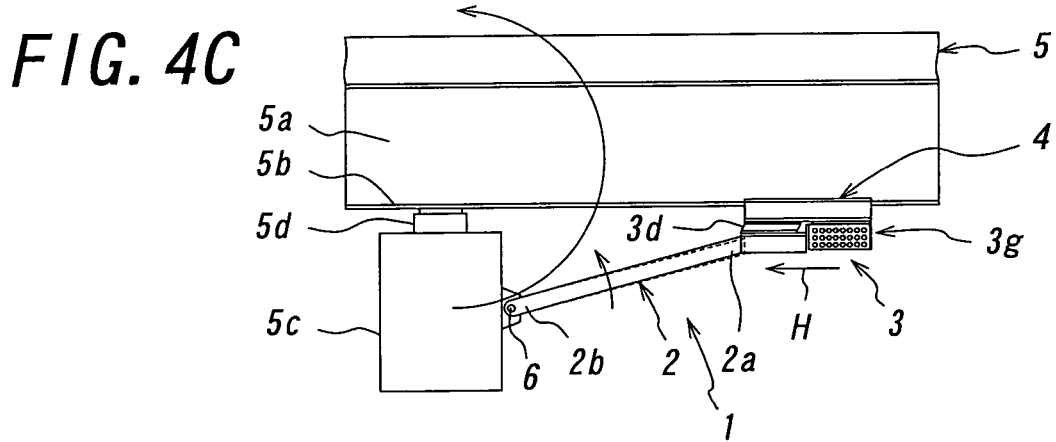
Figure 4D:
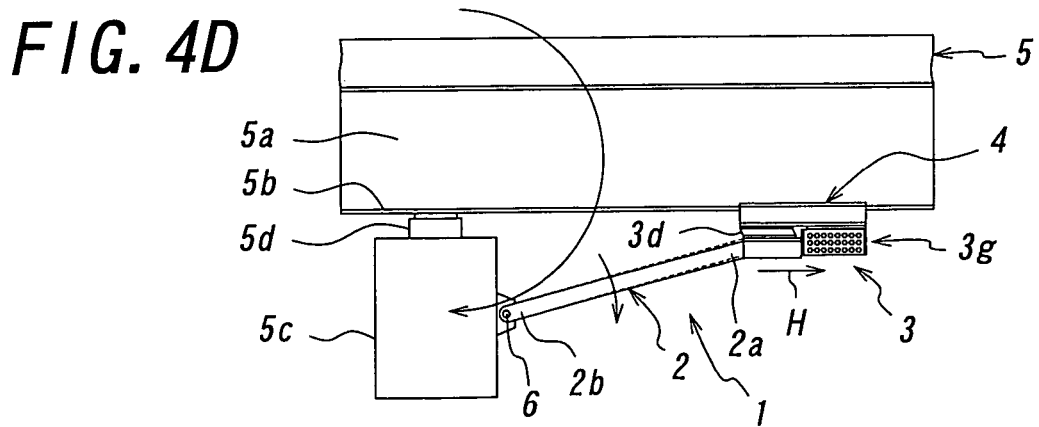

According to the prop-type damping device 1 of the embodiment, because of a height difference between the main girder supporting point of the upper end of the rubber support floor 5d of the pier 5c and the position of the pier 5c to which the lower end 5b of the prop member 2 is connected, when the main girder 5a is shaken up as indicated by a chain double-dashed line in A of FIG. 4A, the higher end 2a of the prop member 2 is horizontally moved relative to the lower flange 5b of the main girder 5a in a direction for approaching the main girder supporting point (left in the drawing) as indicated by an arrow H in FIG. 4C. When the main girder 5a is shaken down as indicated by a chain double-dashed line in B of FIG. 4A, the higher end 2a of the prop member 2 is horizontally moved relative to the lower flange 5b of the main girder 5a in a direction for moving away from the main girder supporting point (right in the drawing) as indicated by an arrow H in FIG. 4D. Then, the damper 3 connected to the higher end 2a of the prop member 2 and the lower flange 5b of the main girder 5a brakes the relative horizontal movements therebetween.

Thus, according to the prop-type damping device 1 of the embodiment, it is possible to prolong a life of the bridge and greatly improve comfort for bridge users by effectively consuming energy of up-and-down vibration on the main girder 5a of the bridge 5 caused by earthquakes, winds, passing vehicles or the like with a simple constitution.

According to the prop-type damping device 1 of the embodiment, the damper 3 has the quake absorbing rubber (high damping rubber) 3d, and the magnetic damping section 3g which brakes the damping copper plates 3e by a number of permanent magnets of the permanent magnet mounting stainless plates 3f and the quake absorbing rubber 3d and the magnetic damping section 3g are simple in constitution. Thus, maintenance management of the damping device 1 can be facilitated.

Furthermore, according to the prop-type damping device 1 of the present invention, since the lower end 2b of the prop member 2 is connected swingably by a pin 6 to the pier 5c for supporting the main girder 5a, up-and-down movement of the higher end 2a of the prop member 2 which accompanies the up-and-down movement of the main girder 5a is facilitated more. Thus, it is possible to make smoother relative horizontal movements of the higher end 2a of the prop member 2 and the lower flange 5b of the main girder 5a.

Figure 5A:
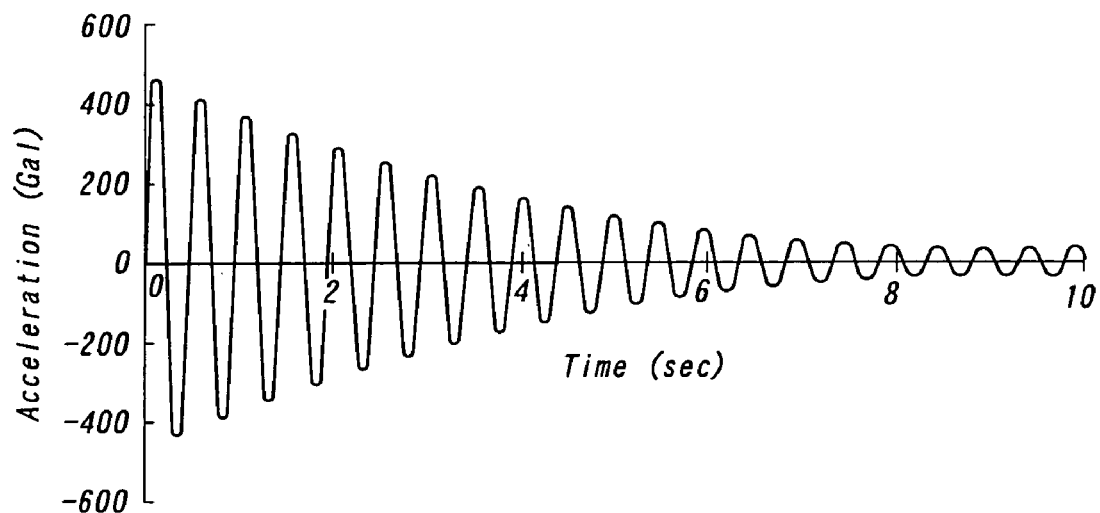
FIGS. 5A and 5B are characteristic diagrams showing vibration damping states of a cantilever beam when a damping device model similar in constitution to the prop-type damping device of the embodiment is present and when the damping device model is not present, respectively.
Figure 5B:
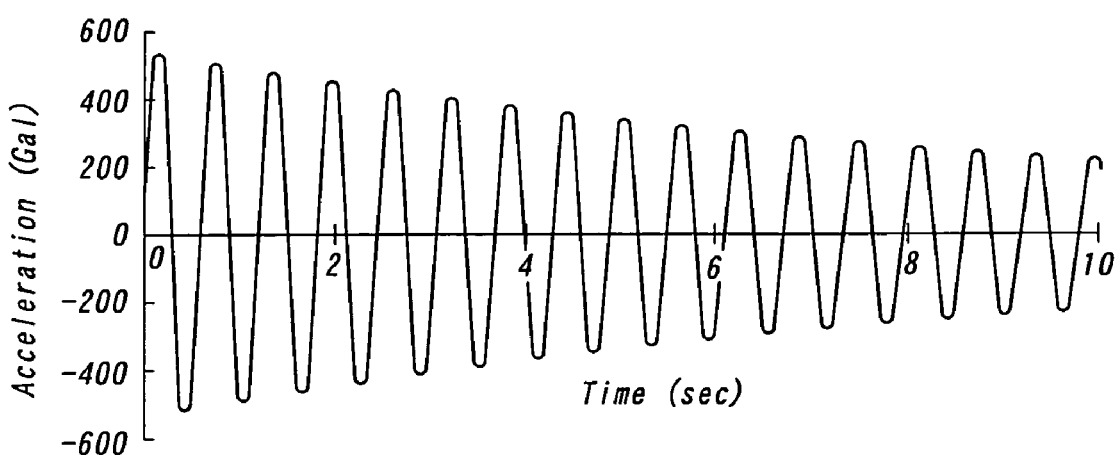

FIGS. 5A and 5B show results of a vibration experiment carried out by disposing and non-disposing a model similar in constitution to the prop-type damping device 1 of the embodiment near a base of a cantilever beam: FIG. 5A showing a case in which the prop-type damping device model is present, and FIG. 5B showing a case in which the prop-type damping device model is not present.

As apparent from FIGS. 5A and 5B, large vibration is absorbed in about 10 seconds when the prop-type damping device is attached. However, vibration damping does not occur to a very large extent even after a passage of 10 seconds when the prop-type damping device is not attached, and large vibration continues. This result apparently shows that the damping device 1 of the embodiment has a large damping effect.

The description has been made based on the illustrated embodiment However, the embodiment is not limitative of the present invention. Proper changes can be made when necessary within the scope of the appended claims. For example, the magnetic damping section 3g may be omitted when necessary, and the lower end 2b of the prop member 2 may be fixedly connected to the pier 5c for supporting the main girder 5a. Additionally, the prop-type damping device of the present invention may be installed not only in the pier 5c but also over an abutment and the bridge girder.

Thus, according to the prop-type damping device of the present invention, it is possible to effectively absorb the energy of up-and-down vibration on the main girder of the bride caused by earthquakes, winds, vehicles or the like with a simple constitution, and to prolong the life of the bridge, and to greatly improve comfort for bridge users.

What is claimed is:

1. A prop-type damping device comprising:
    an inclined prop member having a higher end thereof connected to a lower part of a main girder of a bridge to be horizontally movable relative to the lower part, and a lower end thereof connected to a position below a main girder supporting point of a pier or abutment for supporting the main girder to permit up-and-down movement of the higher end, so as to convert up-and-down movements of the main girder to relative horizontal movements between the lower part of the main girder and the higher end of the inclined prop member; and
    a damper connected to the higher end of the prop member and the main girder lower part to brake the relative horizontal movements between the lower part of the main girder and the higher end of the inclined prop member.

2. The prop-type damping device according to claim 1, wherein the damper has a quake absorbing rubber.

3. The prop-type damping device according to claim 1, wherein the damper has a magnetic damping section.

4. The prop-type damping device according to claim 1, wherein the lower end of the prop member is connected swingably by a pin to the pier or abutment for supporting the main girder.

5. The prop-type damping device according to claim 2, wherein the damper has a magnetic damping section.

6. The prop-type damping device according to claim 2, wherein the lower end of the prop member is connected swingably by a pin to the pier or abutment for supporting the main girder.

7. The prop-type damping device according to claim 3, wherein the lower end of the prop member is connected swingably by a pin to the pier or abutment for supporting the main girder.

8. A prop-type damping device comprising:
    an inclined prop member having a higher end thereof connected to a lower part of a main girder of a bridge to be horizontally movable relative to the lower part, and a lower end thereof connected to a position below a main girder supporting point of a pier or abutment for supporting the main girder to permit up-and-down movement of the higher end; and
    a damper connected to the higher end of the prop member and the main girder lower part to brake relative horizontal movements therebetween, wherein the damper has a magnetic damping section.

9. The prop-type damping device according to claim 8, wherein the lower end of the prop member is connected swingably by a pin to the pier or abutment for supporting the main girder.

10. A prop-type damping device comprising:
    an inclined prop member having a higher end thereof connected to a lower part of a main girder of a bridge to be horizontally movable relative to the lower part, and a lower end thereof connected to a position below a main girder supporting point of a pier or abutment for supporting the main girder to permit up-and-down movement of the higher end; and
    a damper connected to the higher end of the prop member and the main girder lower part to brake relative horizontal movements therebetween, wherein the damper has a quake absorbing rubber and a magnetic damping section.

* * * * *